(12) United States Patent
Lu et al.

(10) Patent No.: US 12,362,937 B2
(45) Date of Patent: Jul. 15, 2025

(54) ELECTRONIC DEVICE AND METHOD FOR PROTECTING SEED DATA PACKET THEREOF

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 351 days.

(21) Appl. No.: 17/791,318

(22) PCT Filed: Jul. 28, 2021

(86) PCT No.: PCT/CN2021/108955
§ 371 (c)(1),
(2) Date: Jul. 7, 2022

(87) PCT Pub. No.: WO2022/037379
PCT Pub. Date: Feb. 24, 2022

(65) Prior Publication Data
US 2023/0353364 A1 Nov. 2, 2023

(30) Foreign Application Priority Data
Aug. 20, 2020 (CN) .......................... 202010840499.2

(51) Int. Cl.
*H04L 9/32* (2006.01)
*H04L 9/08* (2006.01)

(52) U.S. Cl.
CPC .......... *H04L 9/3226* (2013.01); *H04L 9/0825* (2013.01); *H04L 9/3263* (2013.01)

(58) Field of Classification Search
CPC .... H04L 9/3226; H04L 9/0825; H04L 9/3263
(Continued)

(56) References Cited

U.S. PATENT DOCUMENTS

2010/0082988 A1* 4/2010 Huebner ............... H04L 9/0869
713/193
2019/0280866 A1 9/2019 Zhuang et al.

FOREIGN PATENT DOCUMENTS

| CN | 101719826 A | 6/2010 |
|---|---|---|
| CN | 103607281 A * | 2/2014 |

(Continued)

OTHER PUBLICATIONS

International Search Report (with English Translation) and Written Opinion mailed Oct. 26, 2021, in corresponding to International Application No. PCT/CN2021/108955; 10 pages.

(Continued)

*Primary Examiner* — Moeen Khan
(74) *Attorney, Agent, or Firm* — Maier & Maier, PLLC

(57) ABSTRACT

An electronic device and a method for protecting seed data packet thereof, which relate to the field of information security. The electronic device includes a receiving module, a first obtaining module, a first determining module, a first confirming module, a sending module, a first verifying module, a second determining module, a checking module, a first setting module, a second setting module, a second verifying module, a generating and storing module, a third setting module, a fourth setting module, a data storing module, a key generating module, a third verifying module, a second confirming module, a second obtaining module and an organizing module.

17 Claims, 7 Drawing Sheets

(58) Field of Classification Search
USPC .......................................................... 713/168
See application file for complete search history.

(56) References Cited

FOREIGN PATENT DOCUMENTS

| CN | 107480986 A | * | 12/2017 | ........... G06Q 20/065 |
|----|-------------|---|---------|-------------------------|
| CN | 109063450 A |   | 12/2018 |                         |
| CN | 109146470 A |   | 1/2019  |                         |
| CN | 109257332 A | * | 1/2019  | ............... G06F 8/65 |
| CN | 110310105 A |   | 10/2019 |                         |
| CN | 111709060 A |   | 9/2020  |                         |
| WO | 2018076365 A1 |   | 5/2018 |                         |

OTHER PUBLICATIONS

First Search dated Sep. 27, 2020, corresponding to Chinese Application No. 202010840499.2, 1 page.
First Office Action dated Oct. 10, 2020, corresponding to Chinese Application No. 202010840499.2, 7 pages (with English Translation).
Supplementary Search dated Oct. 22, 2020, corresponding to Chinese Application No. 202010840499.2; 1 page.
Notification to Grant Patent Right for Invention dated Oct. 30, 2020, corresponding to Chinese Application No. 202010840499.2, 3 pages (with English Translation).

* cited by examiner

ELECTRONIC DEVICE AND METHOD FOR PROTECTING SEED DATA PACKET THEREOF

CROSS-REFERENCE TO RELATED APPLICATIONS

This application is a national stage of International Application No. PCT/CN2021/108955, filed on Jul. 28, 2021, which claims priority to Chinese Patent Application No. 2020108404992, filed on Aug. 20, 2020. Both of the aforementioned applications are hereby incorporated by reference in their entireties.

TECHNICAL FIELD

The present disclosure relates to the field of information security and, in particular, to an electronic device and a method for protecting seed data packet thereof.

BACKGROUND

At present, when sending data to some data receivers, some those electronic devices need to know account addresses of the data receivers and perform encryption on data by using an account private key, and then send encrypted data to the data receivers according to the account addresses of the data receivers. However, those account addresses and the account private key are generated by the electronic device according to its private key and public key, therefore, there will be requirements to protect seed data used for generating the private key and the public key.

However, when an existing host computer communicates with an electronic device, a host computer obtains or tampers seed data in the electronic device by instructions. When receiving the instructions of the host computer, the electronic device only decrypts and verifies the instructions in a simple way before modifying the seed data in the electronic device or returning the seed data to the host computer according to the instructions. Therefore, malicious obtaining or tampering of the seed data in the electronic device by the host computer cannot be avoided and security is poor; and it is urgent to solve the problem by an electronic device and a method for protecting seed data packet thereof.

SUMMARY

In order to avoid technical defection of the prior art, the present disclosure provides an electronic device and a method for protecting seed data packet thereof.

The present disclosure provides a method for protecting seed data packet by an electronic device, which includes following steps:
  step S0L obtaining, by the electronic device, managing instruction label data from a data managing instruction when receiving the data managing instruction sent by a host computer; and determining whether a stored authorizing data block includes the managing instruction label data, if yes, executing step S02, if no, reporting an error response to the host computer;
  step S02, determining, by the electronic device, a type of the data managing instruction according to the managing instruction label data, if the type of the data managing instruction is a seed data importing instruction, executing step S03; if the type of the data managing instruction is a random number seed generating instruction, executing step S05; and if the type of the data managing instruction is a seed data exporting instruction, executing step S07;
  step S03, performing, by the electronic device, a PIN code data verifying operation according to the data managing instruction, if PIN code data verifying is successful, determining whether the seed data packet in the data managing instruction is legitimate according to preset seed data format, if yes, executing step S04, if no, reporting an error response to the host computer;
  step S04, checking, by the electronic device, a current purse state, if the current purse state is an available state, returning an error response to the host computer; otherwise, setting the current purse state to be an available state, setting an export state; and executing step S06;
  step S05, performing, by the electronic device, a PIN code data verifying operation according to the data managing instruction, if PIN code data verifying is successful, generating the random number and taking the random number as a random number seed and storing the random number seed in the seed data packet; setting a current purse state as an available state; setting an export state; and executing step S06;
  step S06, storing, by the electronic device, the seed data packet; obtaining a root key according to the seed data packet and a first preset curve, obtaining an account public key and an account private key according to a root key, a second preset curve and a stored currency identification, obtaining an account address according to the account public key, storing the account address and the account private key correspondingly and sending a data managing response to the host computer; and
  step S07, performing, by the electronic device, a PIN code data verifying operation according to the data managing instruction, if PIN code data verifying is successful, determining an export state of the seed data packet, if the export state is supportable, obtaining the seed data packet, organizing a data managing response according to the seed data packet, sending the data managing response to the host computer; and if the export state is not supportable, sending an error response to the host computer.

The present disclosure provides an electronic device. The electronic device includes: a receiving module, a first obtaining module, a first determining module, a first confirming module, a sending module, a first verifying module, a second determining module, a checking module, a first setting module, a second setting module, a second verifying module, a generating and storing module, a third setting module, a fourth setting module, a data storing module, a key generating module, a third verifying module, a second confirming module, a second obtaining module and an organizing module;
  the receiving module is configured to receive a data managing instruction sent by a host computer;
  the first obtaining module is configured to obtain managing instruction label data from the data managing instruction received by the receiving module;
  the first determining module is configured to determine whether a stored authorizing data block includes the managing instruction label data obtained by the first obtaining module;
  the first confirming module is configured to determine a type of the data managing instruction according to the managing instruction label data obtained by the first obtaining module if a determining result of the first determining module is yes;

the sending module is configured to send an error response to the host computer if a determining result of the first determining module is no;

the first verifying module is configured to perform a PIN code data verifying operation according to the data managing instruction if the first confirming module confirms that the data managing instruction is a seed data importing instruction;

the second determining module is configured to determine whether a seed data packet in the data managing instruction is legitimate according to preset seed data format if the first verifying module verifies PIN code data successfully;

the sending module is further configured to send an error response to the host computer if a determining result of the second determining module is no;

the checking module is configured to check a current purse state if a determining result of the second determining module is yes;

the sending module is further configured to send an error response to the host computer if the checking module checks that the current purse state is an available state;

the first setting module is configured to set the current purse state to be an unavailable state if the checking module checks that the current purse state is an unavailable state;

the second setting module is configured to set an export state if the checking module checks that the current purse state is an unavailable state;

the second verifying module is configured to perform a PIN code data verifying operation according to the data managing instruction if the first confirming module confirms that the data managing instruction is a random number seed generating instruction;

the generating and storing module is configured to generate a random number and take the random number as random number seed, and store the random number seed in the seed data packet if the second verifying module verifies PIN code data successfully;

the third setting module is configured to set the current purse state to be an available state if the second verifying module verifies PIN code data successfully;

the fourth setting module is configured to set an export state if the second verifying module verifies PIN code data successfully;

the data storing module is configured to store a seed data packet if the second verifying module verifies PIN code data successfully;

the key generating module is configured to obtain a root key according to the seed data packet stored by the data storing module and a first preset curve, obtain an account public key and an account private key according to the root key, a second preset curve and a stored currency identification, obtain an account address according to the account public key, and store the account address and the account private key correspondingly;

the third verifying module is configured to perform a PIN code data verifying operation according to the data managing instruction if the first confirming module confirms that the data managing instruction is a seed data exporting instruction;

the second confirming module is configured to confirm an export state of the seed data packet if the third verifying module verifies PIN code data successfully;

the second obtaining module is configured to obtain the seed data packet if the second confirming module confirms that the export state is that the export state is supportable;

the organizing module is configured to organize a data managing response according to the seed data packet obtained by the second obtaining module;

the sending module is further configured to send the data managing response organized by the organizing module sent to the host computer; and the sending module is further configured to send an error response to the host computer if the second confirming module confirms that the export state is that the export state is not supportable.

Advantages achieved by using the above technical solutions are as following: the present disclosure provides an electronic device and a method for protecting the seed data packet thereof; in the method, if the electronic device receives a data managing instruction sent by the host computer, the electronic device performs verifying for multiple times according to the data managing instruction before updating seed data in the electronic device via performing an operation of importing seed data packet or performing generating seed data packet, or returning a seed data packet to the host computer via performing an operation of importing seed data. The seed data packet in the electronic device is not easily leaked, tampered or forged and security is high.

BRIEF DESCRIPTION OF THE DRAWINGS

FIG. 2-1, FIG. 2-2, FIG. 2-3 and FIG. 2-4 are flow charts of a method for protecting seed data packet of an electronic device provided by Embodiment 2 of the present disclosure; and FIG. 3 is a block diagram of an electronic device provided by Embodiment 3 of the present disclosure.

DETAILED DESCRIPTION OF THE EMBODIMENTS

In order to make purpose, technical solution and advantages of the present disclosure to be clearer, embodiments of the present disclosure are described clearly and completely in conjunction with the accompanying drawings in the below.

Embodiment 1

Figure 1:
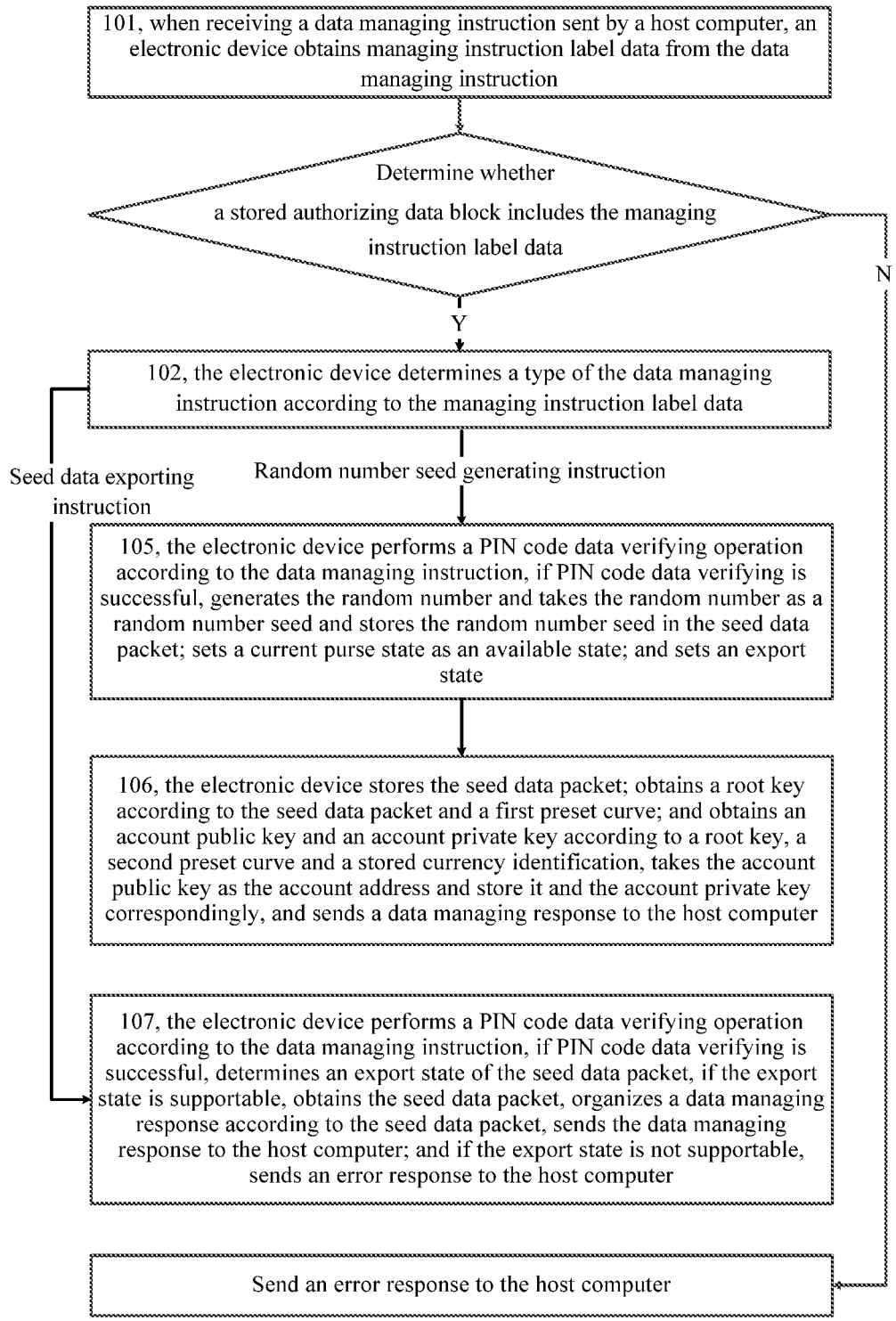
FIG. 1-1 and FIG. 1-2 are flow charts of a method for protecting seed data packet by an electronic device provided by Embodiment 1 of the present disclosure.
Figures 1, 2:
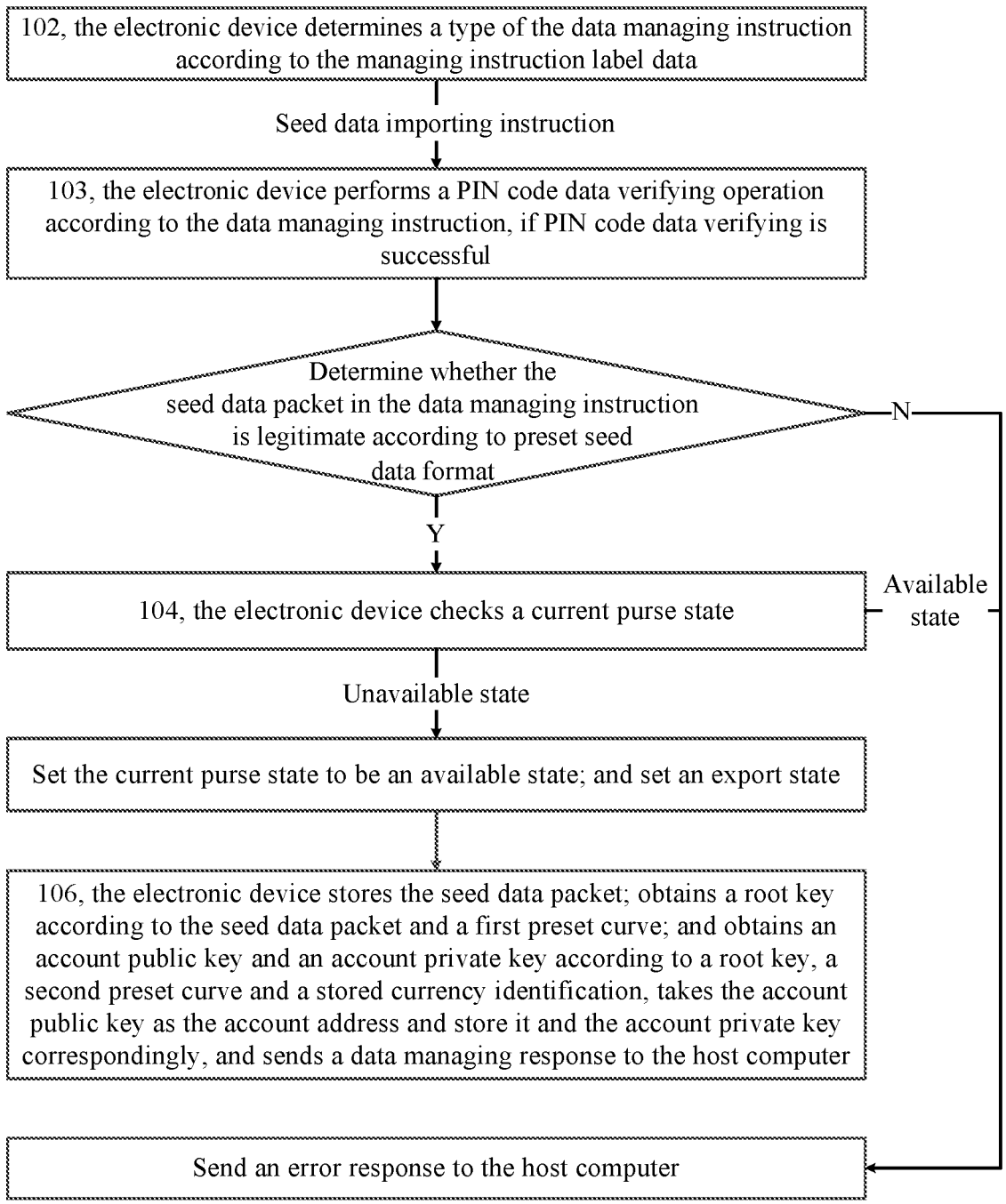

This embodiment provides a method for protecting seed data packet by an electronic device. As shown in FIG. 1-1 and FIG. 1-2, the method includes following steps:

step 101, when receiving a data managing instruction sent by a host computer, an electronic device obtains managing instruction label data from the data managing instruction; and determines whether a stored authorizing data block includes the managing instruction label data, if yes, execute step 102, if no, reports an error response to the host computer;

step 102, the electronic device determines a type of the data managing instruction according to the managing instruction label data, if the type of the data managing instruction is a seed data importing instruction, executes step 103, if the type of the data managing instruction is a random number seed generating instruction, executes step 105; and if the type of the data managing instruction is a seed data exporting instruction, executes step 107;

step 103, the electronic device performs a PIN code data verifying operation according to the data managing instruction, if PIN code data verifying is successful, determines whether the seed data packet in the data managing instruction is legitimate according to preset seed data format, if yes, executes step 104, if no, reports an error response to the host computer;

step 104, the electronic device checks a current purse state, if the current purse state is an available state, returns an error response to the host computer; otherwise, sets the current purse state to be an available state, sets an export state; and executes step 106;

step 105, the electronic device performs a PIN code data verifying operation according to the data managing instruction, if PIN code data verifying is successful, generates the random number and takes the random number as a random number seed and stores the random number seed in the seed data packet; sets a current purse state as an available state; sets an export state; and execute step 106;

step 106, the electronic device stores the seed data packet; obtains a root key according to the seed data packet and a first preset curve, obtains an account public key and an account private key according to a root key, a second preset curve and a stored currency identification, obtains an account address according to the account public key, stores the account address and the account private key correspondingly and sends a data managing response to the host computer; and step 107, the electronic device performs a PIN code data verifying operation according to the data managing instruction, if PIN code data verifying is successful, determines an export state of the seed data packet, if the export state is supportable, obtains the seed data packet, organizes a data managing response according to the seed data packet, sends the data managing response to the host computer; and if the export state is not supportable, sends an error response to the host computer.

Optionally, before step 101, the method further includes: step M01, the electronic device verifies legitimacy of a host computer certificate in an authorizing instruction when receiving the authorizing instruction sent by a host computer, if the host computer certificate is legitimate, obtains an authorizing data block from host computer certificate in the authorizing instruction and stores the authorizing data block; and if the host computer certificate is not legitimate, sends an error response to the host computer.

Further, if the host computer certificate is legitimate, the method further includes: the electronic device determines whether stored authorizing data block is equal to third preset data, if yes, waits for receiving a data managing instruction sent by the host computer; obtains managing instruction label data from the data managing instruction when receiving the data managing instruction sent by the host computer, and executes step 102; otherwise, executes step 101.

Optionally, in step 101, the method further includes: the electronic device determines whether stored authorizing data block is equal to third preset data, if yes, executes step 102; otherwise, determines whether the stored authorizing data block includes the managing instruction label data.

Optionally, in step 101, if yes, the method further includes: the electronic device determines whether a preset authorizing managing table includes the managing instruction label data, if yes, executes step 102; otherwise, sends an error response to the host computer.

Preferably, in step 104, the setting the export state is specifically that the electronic device determines the export state according to the seed data packet in the data managing instruction, if the seed data packet includes entropy data, the export state is that the export state is supportable; and if the seed data packet does not include entropy data, the export state is that the export state is not supportable;

further, when it is determined that the export state is that the export state is supportable, the method further includes: the electronic device sets an export state identification to be a sixth preset data; and when the export state is that the export state is not supportable, the method further includes: the electronic device sets the export state identification to be seventh preset data;

further, in step 105, the setting the export state is specifically that the electronic device sets the export state identification to be seventh preset data; and further, in step 107, the determining the export state of the seed data packet is specifically that the electronic device determines a type of an export state identification, if the type is a sixth preset data, obtains seed data packet sored therein, organizes a data managing response according to the seed data packet, sends the data managing response to the host computer, and if the type is seventh preset data, sends an error response to the host computer.

Correspondingly, in step 107, the determining the export state of the seed data packet is specifically that the electronic device determines whether seed data packet stored therein includes entropy data, if yes, the export state is that the export state is supportable; if no, the export state is that the export state is not supportable.

Optionally, in step 104, the setting export state is specifically that the electronic device obtains export state data from the seed data packet, determines a type of the export state according to the export state data, if the export state data is first preset export data, the export state is that the export state is supportable; and if the export state data is second preset export data, the export state is that the export state is not supportable;

further, when the export state is determined to be that the export state is supportable, the method further includes: the electronic device sets the export state identification to be a sixth preset date; and when the export state is determined to be that the export state is not supportable, the method further includes that the electronic device sets the export state identification to be seventh preset data;

further, in step 105, the setting the export state is specifically that the electronic device sets the export state identification to be seventh preset data; and further, in step 107, the determining the export state of the seed data packet is specifically that the electronic device determines a type of an export state identification, if the type is a sixth preset data, obtains stored seed data packet stored therein, organizes a data managing response according to the seed data packet, sends the data managing response to the host computer, and if the type is seventh preset data, sends an error response to the host computer.

Preferably, in step 106, the obtaining the root key according to the seed data packet and the first preset curve, obtaining the account public key and the account private key according to the root key, the second preset curve and the stored currency identification is specifically: the electronic device obtains a root key by performing calculation on the seed data in the seed data packet and a first preset curve according to a first preset algorithm; and obtains the account public key and the account private key by performing calculation on the root key, a second preset curve and the stored currency identification according to a second preset algorithm.

Optionally, performing a PIN code data verifying operation according to the data managing instruction is specifically that the electronic device obtains a first PIN code data from the data managing instruction; obtains second PIN code data stored therein; determines whether the second PIN code data is equal to the first PIN code data, if yes, verifies PIN code data is successful; otherwise, verifies PIN code data is failed;

further, performing a PIN code data verifying operation according to the data managing instruction further includes: the electronic device determines whether the stored count data is legitimate, if yes, updates the count data, and obtains the first PIN code data from the data managing instruction; otherwise, performs a resetting operation, returns an error response to the host computer; and further, if verifying PIN code data is successful, the method further includes: the electronic device resets the count data.

Further, resetting an operation is specifically that the electronic device resets the count data; deletes seed data packet; and resets the second PIN code data, sets a current purse state to be unavailable state, and returns an error response to the host computer.

Optionally, in step 102, the method further includes: if the type of the data managing instruction is a PIN code updating instruction, the electronic device performs a PIN code data verifying operation according to the data managing instruction; and if PIN code data verifying is successful, obtains third PIN code data from the data managing instruction, taking the third PIN code data as new second PIN code data and storing the new second PIN code data; and sends a data managing response to the host computer.

Optionally, in step 102, the method further includes that if the type of the data managing instruction is a resetting instruction, the electronic device resets count data; deletes seed data packet; resets the second PIN code data, and sets the current purse state to be an unavailable state; and sends data managing response to the host computer.

Optionally, in step 102, the method further includes: if the type of the data managing instruction is an application updating instruction, the electronic device performs a PIN code data verifying operation according to the data managing instruction; and if PIN code data verifying is successful, uses application data in the data managing instruction to update stored application data and sends a data managing response to the host computer.

Optionally, in step 102, the method further includes: if the type of the data managing instruction is a certificate updating instruction, the electronic device performs a PIN code data verifying operation according to the data managing instruction; and if PIN code data verifying is successful, uses a device certificate in the data managing instruction to update a stored device certificate and sends a data managing response to the host computer.

Embodiment 2

This embodiment provides a method for protecting seed data packet of an electronic device. As shown in FIG. 2-1, FIG. 2-2, FIG. 2-3 and FIG. 2-4, the method includes following steps:

Step 201, when receiving a data managing instruction sent by the host computer, the electronic device obtains managing cipher data from the data managing instruction, uses a session key to decrypt the managing cipher data to obtain managing plain data; and obtains managing instruction label data from the managing plain data;

optionally, in this step, the obtaining managing instruction label data from the managing plain data is specifically that the electronic device takes data of a first preset byte length from the managing plain data as the managing instruction label data.

Optionally, after this step, the method further includes: the electronic device determines whether a stored authenticating data block is equal to third preset data, if yes, executes step 203; if no, executes step 202.

Optionally, before this step, the method further includes:

step C01, when receiving an authorizing instruction sent by the host computer, the electronic device parses the authorizing instruction to obtain a host computer certificate; obtains an authorizing data block from the host computer certificate; and sends an authorizing response to the host computer;

further, before this step, the method further includes: the host computer organizes an authorizing instruction according to a host computer certificate and sends the authorizing instruction to the electronic device;

for example, the authorizing instruction is:
0x802A1810EC7F2181E89310434552545F4150505F4-5434B41303031420D6A756 26974657277616C6-C65745F200D6A756269746572776166C6C6574950-200805F250420200525 5F24042025052453000BF2-00EEF0C8D0A820182028203820482057F4946B04-1048FD3FAB39 07C5CC8CD193EB2B653EA1-79115B7F305C9E21DE6D29C0736A3B82025B219-F24BDA86 D80F5AE262521E124F4C6691A0C4-7B1FB72D95895E9312CBODF001005F374630440-2204 D75EAA2F09604A9597DA905D680EB61-9B8ADCF080E5AD6950E1DBF26195C9E2022067 649AFB4A8BC380B382520499C6F2BB350A8519B-0ECDBE0B7374AA898826D0E;

further, in step COL after obtaining the authorizing data block from the host computer certificate, the step further includes: the electronic device stores the authorizing data block to a buffer;

for example, the authorizing data block is: 0xBF200EEF0C8D0A82018202820382048205; and correspondingly, step 201 further includes: the electronic device obtains an authorizing data block from the buffer.

Further, in step COL after obtaining the authorizing data block from the host computer certificate, the step further includes step C11, the electronic device determines whether a stored authorizing data block is equal to third preset data, if yes, sends an authorizing response to the host computer, and executes step C12; otherwise, sends an authorizing response to the host computer, and executes step 201;

for example, the third preset data is 0x00;

step C12, when receiving the data managing instruction sent by the host computer, the electronic device obtains managing instruction label data from the data managing instruction; and executes step 203.

Step C02, the electronic device communicates and builds a security channel with the host computer to obtain a session key;

further, the method includes: the electronic device communicates and builds a security channel with the host computer to obtain security level; and correspondingly, after this step, the method further includes: the electronic device determines a type of the security level, if the type is a session key type, executes step 203; and if the type is a MAC type, executes a session MAC operation and return managing response data to the host computer.

For example, the data managing instruction is:
0x84CB800068AC9E99DA82B08C2D2A74A0D51871-3C62766637B8747E55EB31 193E7B825350B62552-AE2674923070E58B0895AA04EFBB5E86D1B7E-B0230B05539E0A3 FADE3983BE2351CCECB-D82E6666613F9ECB8CAB4119002286A6D6ECB-36BB0C639566 027D90C7FF0A91F4E711;

the managing cipher data is:
0xAC9E99DA82B08C2D2A74A0D518713C6276663-7B8747E55EB31193E7B8253 50B62552AE26749-23070E58B0895AA04EFBB5E86D1B7EB0230B0-5539E0A3FADE3983B E2351CCECBD82E66666-13F9ECB8CAB4119002286A6D6ECB36BB0C-639566027D90C7FF 0A91F4E711; and the managing plain data is:
0xDFFE5A8202570435353535310042BA54A95B4E29-E89A10F7BFA6F1166400AE 3F096B7B0F46AFE-CCCB1B9B170CA02342CC4948AD9E9D2259262-F28783FBDBE16AF8 5228F9E0945923A4D65-FDF5F549115D06E404AE6880048B745B2ACBFC.

The first preset byte length is 0x02.
The managing instruction label data is 0x8205.
Step 202, the electronic device determines whether stored authorizing data block includes managing instruction label data, if yes, executes step 203; otherwise, executes step D21.

For example, the authorizing data block is 0xBF200EEF0C8D0A82018202820382048205.
The managing instruction label data is 0x8205.

Step 203, the electronic device determines whether a preset authorizing managing table includes managing instruction label data, if yes, executes step 204; otherwise, executes step D21.

For example, the preset authorizing managing table is 0x82018202820382048205.

For example, the managing instruction label data is 0x8205.

Step 204, the electronic device determines a type of data managing instruction according to managing instruction label data in the managing plain data, if the type is seed data importing instruction, executes step 211; if the type is a random number seed generating instruction, executes step 221; and if the type is a seed data exporting instruction, executes step 231.

Optionally, this step is specifically that the electronic device determines a type of the data managing instruction according to the managing instruction label data, if the managing instruction label data is first preset label data, the data managing instruction is a seed data importing instruction, executes step 211; if the managing instruction label data is second preset label data, the data managing instruction is a random number seed generating instruction, executes step 221; and if the managing instruction label data is third preset label data, the data managing instruction is a seed data exporting instruction, and executes step 231;

for example, the first preset label data is 0x8201;
the second preset label data is 0x8203; and
the third preset label data is 0x8202.

Step 211, the electronic device determines whether stored count data is legitimate, if yes, executes step 213; otherwise, executes step 212.

Optionally, this step is specifically that the electronic device determines whether stored count data is equal to fourth preset data, if yes, the count data is not legitimate, and executes step 212; otherwise, executes step 213.

Correspondingly, in step 212 and step 214, the electronic device resetting count data is specifically that the electronic device sets count data as default count data.

Correspondingly, in Step 213, the electronic device updating the count data is specifically that the electronic device deducts an eighth preset data from the count data;

for example, the count data is 0x05;
the default count data is 0x00;
the eighth preset data is 0x01; and
the fourth preset data is 0x00.

In this case, the factory setting of count data of the electronic device is default count data.

Optionally, this step is specifically that the electronic device determines whether stored count data is less than fifth preset data, if yes, the count data is legitimate, and executes step 213; otherwise, executes step 212.

Correspondingly, in step 212 and step 214, the electronic device resetting count data is specifically that the electronic device sets count data as default count data.

Correspondingly, in step 213, the electronic device updating the count data is specifically that the electronic device adds an eighth preset data to the count data;

for example, the count data is 0x05;
the default count data is 0x00;
the eighth preset data is 0x01; and
the fifth preset data is 0x0A.

In this case, the factory setting of count data of the electronic device is default count data.

Optionally, this step is that the electronic device determines whether stored count data is more than or equal to fifth preset data, if yes, the count data is not legitimate, executes step 212;
otherwise, executes step 213.

Correspondingly, in step 212 and step 214, the electronic device resetting count data is specifically that the electronic device sets count data as default count data.

Correspondingly, in step 213, the electronic device updates count data is specifically that the electronic device adds an eighth preset data to the count data.

In this case, the factory setting of count data of the electronic device is default count data.

Step 212, the electronic device resets the count data; deletes the seed data packet; resets a second PIN code data; sets the current purse state as an unavailable state; and executes step D21.

Optionally, in this step, the resetting the second PIN code data is specifically that the electronic device sets the second PIN code data as default PIN code data.

For example, the data managing instruction is:
0x84CB800068AC9E99DA82B08C2D2A74A0D51871-3C62766637B8747E55EB31 193E7B825350B625-52AE2674923070E58B0895AA04EFBB5E86D1B7-EB0230B05539E0A3 FADE3983BE2351CCEC-BD82E6666613F9ECB8CAB4119002286A6D6ECB-36BB0C639566 027D90C7FF0A91F4E711;

the seed data packet is:
0x10042BA54A95B4E29E89A10F7BFA6F1166400A-E3F096B7B0F46AFECCCB1 B9B170CA02342-CC4948AD9E9D2259262F28783FBDBE16AF8522-

8F9E0945923A4D65FD F5F549115D06E404AE68-
80048B745B2ACBFC; and the second PIN code data is: 0x35353535.

Step 213, the electronic device updates the count data; obtains a first PIN code data from the managing plain data; obtains second PIN code data stored therein; and determines whether the second PIN code data is equal to the first PIN code data, if yes, executes step 214;

otherwise, executes step D21.

For example, the managing plain data is:
0x80CB80005DDFFE5A8202570435353535
10042BA54A95B4E29E89A10F7BFA6F1166400AE3-
F096B7B0F46AFECCCB1B9 B170CA02342CC-
4948AD9E9D2259262F28783FBDBE16AF85228F-
9E0945923A4D65FDF5F 549115D06E404A-
E6880048B745B2ACBFC;

the first PIN code data is: 0x35353535; and the second PIN code data is: 0x35353535.

Step 214, the electronic device resets the count data; determines whether the seed data packet in the managing plain data is legitimate according to a preset seed data format, if yes, executes step 215; otherwise, executes step D21.

Optionally, this step is: the electronic device resets the count data; determines whether the seed data packet in the managing plain data matches a preset seed data format, if yes, the seed packet is legitimate, and executes step 215; otherwise, the seed packet is not legitimate, and executes step D21.

For example, the preset seed data format is that the length of the seed data is 64 bytes.

Step 215, the electronic device checks a current purse state, if the current purse state is an available state, executes step D21; and if the current purse state is an unavailable state, executes step 216.

Optionally, in this embodiment, an available situation of the current purse state can be identified according to setting and resetting state of a purse state identification, which can be implemented in two ways: a first way is that when the purse state identification is set, the current purse state is an available state; when the purse state identification is reset, the current purse state is an unavailable state; and a second way is that when the purse state identification is reset, the current purse state is an available state; when the purse state identification is set, the current purse state is an unavailable state.

For the first implemented way, this step is specifically that the electronic device the purse state identification, if the purse state identification is set, the current purse state is an available state, executes step D21; and if the purse state identification is reset, the current purse state is an unavailable state, executes step 216.

For the second implemented way, this step is specifically that the electronic device checks the purse state identification, if the purse state identification is reset, the current purse state is an available state, executes step D21; and if the purse state identification is set, the current purse state is an unavailable state, executes step 216.

Step 216, the electronic device determines an export state; sets the export state; and stores a seed data packet.

Optionally, this step includes following steps:

step C21, the electronic device determines an export state according to the seed data packet in the managing plain data; if the export state is that the export state is supportable, executes step C22; and if the export state is that the export state is not supportable, executes step C23;

step C22, the electronic device updates the current purse state from an unavailable state to an available state and sets the export state to be that the export state is supportable; stores the seed data packet; and executes step 217; and step C23, the electronic device updates the current purse state from an unavailable state to an available state and sets the export state to be that the export state is not supportable; stores the seed data packet; and executes step 217.

Optionally, this step includes following steps:

step C31, the electronic device determines whether the seed data packet includes entropy data, if yes, the export state is that the export state is supportable, executes step C32; if no, the export state is that the export state is not supportable, executes Step C33;

for example, the seed data packet is:
0x10042BA54A95B4E29E89A10F7BFA6F1166400A-
E3F096B7B0F46AFECCCB1 B9B170CA02342-
CC4948AD9E9D2259262F28783FBDBE16AF8522-
8F9E0945923A4D65FD F5F549115D06E-
404AE6880048B745B2ACBFC;

the entropy data is:
0x042BA54A95B4E29E89A10F7BFA6F1166;

step C32, the electronic device updates the current purse state from an unavailable state to an available state and the sets the export state to be that the export state is supportable; stores the seed data packet; and executes step 217; and step C33, the electronic device updates the current purse state from an unavailable state to an available state and sets the export state to be that export state is not supportable, stores the seed data packet; and executes step 217.

Optionally, this step includes following steps:

step C41, the electronic device obtains the export state data from the seed data packet, determines a type of the export state according to the export state data, if the export state data is first preset export data, the export state is that the export state is supportable, executes step C42; and if the export state data is second preset export data, the export state is that the export state is not supportable, executes step C43;

step C42, the electronic device updates the current purse state from an unavailable state to an available state and sets the export state to be that export state is supportable; stores the seed data packet; and executes step 217; and step C43, the electronic device updates the current purse state from an unavailable state to an available state and sets the export state to be that the export state is not supportable; stores the seed data packet; and executes step 217.

Optionally, this step includes following steps:

step C5, the electronic device determines an export state according to the seed data packet in the managing plain data; if the export state is that the export state is supportable, sets the export state identification to be a sixth preset data, executes step C52; and if the export state is that the export state is not supportable, sets the export state identification to be seventh preset data, executes step C53;

step C52, the electronic device sets the current purse state from an unavailable state to an available state and sets the export state to be that the export state is supportable; stores the seed data packet; and executes step 217; and step C53, the electronic device updates the current purse state from an unavailable state to an available state, sets the export state to be that the export state is not supportable and stores the seed data packet; and executes step 217.

Further, the sixth preset data is set and the seventh preset data is reset; or the sixth preset data is reset and the seventh preset data is set.

Step 217, the electronic device obtains a root key according to the seed data packet and a first preset curve; obtains an account public key and an account private key according to the root key, a second preset curve and a stored currency identification, obtains an account address according to the account public key, stores the account address and the account private key correspondingly; organizes second plain data according to preset padding data block; and executes step D11.

For example, the seed key packet is:
0x10042BA54A95B4E29E89A10F7BFA6F1166400A-E3F096B7B0F46AFECCCB1 B9B170CA02342CC-4948AD9E9D2259262F28783FBDBE16AF85228F9-E0945923A4D65FD
F5F549115D06E404AE6880048B745B2ACBFC;
the first preset curve is Nist256p1;
the root key is:
0x03B1A0077CCAC9756D293C812D716CCBD7469-0A0DCCBD851F2BC08D436 E36683A7;
the second preset curve is Bitcoin;
the currency identification is 0;
the account public key is:
0x03d5c1375def423491ad6bed6db1b7d80ac2e725c2ea-aa3ff8c052de2b8aa783ff;
the account address is:
1HGRyp2PViwBRExbfC1znFt8d2T95VKiwP;
the account private key is:
0xe27be0ea13d2b4a2a5c36d14ed1e93b67758518fe530-ba03f514d79a142d0530;
the padding data block is:
0x80000000000000000000000000000000; and
the second plain data is:
0x80000000000000000000000000000000.

Optionally, before obtaining the account public key and the account private key according to the root key, the second preset curve and the currency identification, the method further includes: the electronic device presets a currency identification; in this case, the electronic device presets the currency identification before leaving the factory.

Optionally, before obtaining the account public key and the account private key according to the root key, the second preset curve and the currency identification, the method further includes: if the electronic device receives a first instruction sent by the host computer, the electronic device obtains the currency identification from the first instruction and stores the currency identification.

Step D11, the electronic device uses the session key to encrypt the second plain data to obtain second cipher data, obtains a managing data response according to the second cipher data and a second preset state code, and sends the managing data response to the host computer.

For example, the session key is 0x0A5DEE50149023E58130B4D12C32085C;
the second preset state code is:
0x9000;
the second plain data is:
0x80000000000000000000000000000000;
the second cipher data is:
0xA51A48710CA1DD9B066781CDC1F7708C; and
the managing data response is 0xA51A48710CA1DD9B066781CDC1F7708CCEO-CCC4CCB3DEDE69000.

Optionally, after this step, the method further includes: the host computer receives and parses the managing data response to obtain a second preset state code, when the second preset state code is the second preset data, reports an error and ends.

Step D21, the electronic device organizes an error response according to the first preset state code and returns the error response to the host computer.

For example, the first preset state code is 0x6985; and
the error response is 0x6985.0

Optionally, after this step, the method further includes: the host computer receives and parses the error response to obtain the first preset state code, when the first preset state code is the first preset data, reports an error and ends.

Step 221, the electronic device determines whether the stored count data is legitimate, if yes, executes step 223; otherwise, executes step 222.

Optionally, this step is specifically that the electronic device determines whether the stored count data is equal to the fourth preset data, if yes, the count data is not legitimate, executes step 222; otherwise, executes step 223.

Correspondingly, in step 222 and step 224, the electronic device resetting the count data is specifically that the electronic device sets the count data to be default count data.

Correspondingly, in step 223, the electronic device updating the count data is specifically that the electronic device deducts an eighth preset data from the count data.

For example, the count data is 0x05;
the default count data is 0x00;
the eighth preset data is 0x01; and
the fourth preset data is 0x00.

Optionally, this step is specifically that the electronic device determines whether the count data is less than fifth preset data, if yes, the count data is legitimate, executes step 223; otherwise, executes step 222.

Correspondingly, in step 222 and step 224, the electronic device resetting the count data is specifically that the electronic device sets the count data to be default count data.

Correspondingly, in step 223, the electronic device updating the count data is specifically that the electronic device adds an eighth preset data to the count data.

For example, the count data is 0x05;
the default count data is 0x00;
the eighth preset data is 0x01; and
the fifth preset data is 0x0A.

Optionally, this step is specifically that the electronic device determines whether the count data is more than or equal to fifth preset data, if yes, the count data is not legitimate, executes step 222; otherwise, executes step 223.

Correspondingly, in step 222 and step 224, the electronic device resetting the count data is specifically that the electronic device sets the count data to be default count data.

Correspondingly, in step 223, the electronic device updating the count data is specifically that the electronic device adds an eighth preset data to the count data.

For example, the count data is 0x05;
the default count data is 0x00;
the eighth preset data is 0x01; and
the fifth preset data is 0x0A.

For example, if the data managing instruction is a random number seed generating instruction, the data managing instruction is:
0x84CB8000183C359B35B10EBF2857315E860831A-A3B95AB8A5AA6E5F469;

The managing plain data is:
0x80CB80000BDFFE088203050435353535;
the count data is 0x05;
the default count data is 0x00;
the fifth preset data is 0x0A; and
the eighth preset data is 0x01.

Step 222, the electronic device resets the count data; deletes the seed data packet; resets the second PIN code data; sets the current purse state to be an unavailable state; and executes step D21.

Optionally, in this step, resetting the second PIN code data is specifically that the electronic device sets the second PIN code data to be default PIN code data.

Step 223, the electronic device updates the count data; obtains the first PIN code data from the managing plain data; obtains second PIN code data stored therein; determines whether the second PIN code data is equal to the first PIN code data, if yes, executes step 224; otherwise, executes step D21.

For example, the managing plain data is 0x80CB80000BDFFE088203050435353535;
the first PIN code data is 0x35353535;
the second PIN code data is 0x35353535;
the count data is 0x05;
the default count data is 0x00;
the fifth preset data is 0x0A; and
the eighth preset data is 0x01.

Step 224, the electronic device resets the count data; generates a random number and takes the random number as a random number seed and stores the random number seed in the seed data packet; sets the current purse state as an available state; sets an export state; stores the seed data packet; organizes a second plain data according to a preset padding data block; and executes step D11.

For example, the random number is 0x10042BA54A95B4E29E89A10F7BFA6F1166400AE3-F096B7B0F46AFECCCB1B9B170CA 02342CC494-8AD9E9D2259262F28783FBDBE16AF85228F9E09459-23A4D65FDF5F549115 D06E404AE6880048B74-5B2ACBFC;
 the random number seed is 0x10042BA54A95B4E29E89A10F7BFA6F1166400-AE3F096B7B0F46AFECCCB1B9B170CA 02342-CC4948AD9E9D2259262F28783FBDBE16AF8522-8F9E0945923A4D65FDF5F549115 D06E404-AE6880048B745B2ACBFC;
 the seed data packet is 0x10042BA54A9-5B4E29E89A10F7BFA6F1166400AE3F096B7B0F4-6AFECCCB1B9B170CA 02342CC4948AD9E9D22-59262F28783FBDBE16AF85228F9E0945923A4D6-5FDF5F549115 D06E404AE6880048B745B2ACBFC;
 the padding data block is 0x80000000000000000000000000000000; and
 the second plain data is 0x80000000000000000000000000000000.

Optionally, the setting the export state is specifically that the electronic device sets the export state to be that export state is not supportable.

Optionally, the setting the export state is specifically that the electronic device sets the export state to be that export state is supportable.

Optionally, the setting the export state is specifically that the electronic device sets the export state identification to be seventh preset data.

Optionally, the setting the export state is specifically that the electronic device sets the export state identification to be sixth preset data.

Further, the sixth preset data is set and the seventh preset data is reset; or the sixth preset data is reset and the seventh preset data is set.

Optionally, the available situation of the current purse state is identified by the setting or resetting situation of the purse state identification is that when the purse state identification is set, the current purse state is an available state; and when the purse state identification is reset, the current purse state is an unavailable state.

Correspondingly, the setting the current purse state to be an available state is specifically that the electronic device sets the available state identification.

Optionally, the available situation of the current purse state is identified by the setting or resetting situation of the purse state identification is that when the purse state identification is reset, the current purse state is an available state; and when the purse state identification is set, the current purse state is an unavailable state.

Correspondingly, the setting the current purse state to be an available state is specifically that the electronic device resets the available state identification.

Step 231, the electronic device determines whether the stored count data is legitimate, if yes, executes Step 233; otherwise, executes step 232.

Optionally, this step is specifically that the electronic device determines whether the stored count data is equal to fourth preset data, if yes, the count data is not legitimate, executes step 232; otherwise, executes step 233.

Correspondingly, in step 232 and step 234, the electronic device resetting count data is specifically that the electronic device sets the count data to default count data.

Correspondingly, in step 233, the electronic device updating count data is specifically that the electronic device deducts eighth preset data from the count data.

In this case, the count data of the factory setting of the electronic device is default count data.

Optionally, this step is that the electronic device determines whether the stored count data is less than fifth preset data, if yes, the count data is legitimate, executes step 233; otherwise, executes step 232.

Correspondingly, in step 232 and step 234, the electronic device resetting the count data is specifically that the electronic device sets the count data to be default count data.

Correspondingly, in step 233, the electronic device updating the count data is specifically that the electronic device adds eighth preset data to the count data.

In this case, the factory setting of the count data of the electronic device is default count data.

Optionally, this step is specifically that the electronic device determines whether the count data is more than or equal to fifth preset data, if yes, the count data is not legitimate, executes step 232; otherwise, executes step 233.

Correspondingly, in step 232 and step 234, the electronic device resetting the count data is specifically that the electronic device sets the count data to be default count data.

Correspondingly, in step 233, that the electronic device updating the count data is specifically that the electronic device adds the eighth preset data to the count data.

In this case, the factory setting of the count data of the electronic device is default count data.

For example, if the data managing instruction is a seed generating and exporting instruction, the data managing instruction is:

0x84CB80001815A38D1227A74BEEC44A5F5E2B76-
22DDDF91B77E0D3A37D8;
the managing plain data is
0x80CB80000BDEFF088202050435353535;
the count data is 0x05;
the default count data is 0x00;
the fourth preset data is 0x00;
the fifth preset data is 0x0A; and
the eighth preset data is 0x01.

Step 232, the electronic device resets the count data, deletes the seed data packet; resets a second PIN code data; sets the current purse state to be an unavailable state; and executes step D21.

Optionally, in this step, the resetting the second PIN code data is specifically that the electronic device sets the second PIN code data to be default PIN code data.

Step 233, the electronic device updates the count data; obtains a first PIN code data from the managing plain data; obtains second PIN code data stored therein; determines whether the second PIN code data is equal to the first PIN code date, if yes, executes step 234; otherwise, executes step D21.

For example, the first PIN code data is 0x35353535; and the second PIN code data is 0x35353535.

Step 234, the electronic device resets the count data; determines an export state of the seed data packet, if the export state is that the export state is supportable; executes step 235; and if the export state is that the export state is not supportable, executes step D21.

Optionally, this step is specifically that the electronic device sets the count data to be default count data; obtains a seed data packet stored therein, checks an export state of the seed data packet, if the export state is that the export state is supportable, executes step 235; if the export state is that the export state is not supportable, executes step D21.

Optionally, this step is specifically that the electronic device sets the count data to be default count data; determines whether the seed data packet stored therein includes entropy data, if yes, the export state is that the export state is supportable, executes step 235; otherwise, the export state is that the export state is not supportable, sends an error response to the host computer.

Correspondingly, step 235 is specifically that the electronic device obtains a seed data packet stored therein, organizes second plain data according to the entropy data in the seed data packet and a preset padding data block, and executes step D11.

Optionally, this step is specifically that the electronic device sets the count data to be default count data; determines a type of the export state identification, if the type is the sixth preset data, executes step 235; and if the type is the seventh preset data, sends an error response to the host computer.

Further, the sixth preset data is set and the seventh preset data is reset; or the sixth preset data is reset and t the seventh preset data is set.

Correspondingly, step 235 is specifically that the electronic device obtains the seed data packet stored therein, organizes second plain data according to the seed data packet and the padding date block, and executes step D11.

Step 235, the electronic device organizes second plain data according to the seed data packet and the preset padding data block, and executes step D11.

For example, the seed data packet includes:
042BA54A95B4E29E89A10F7BFA6F1166;
the padding data block is:
0x80000000000000000000000000000000;
the second plain data is:
0x042BA54A95B4E29E89A10F7BFA6F11668000000-
00000000000000000000000000;
the second cipher data is:
0xF109EEFAC9FF691585D7F31195EA749B02E4DB-
7A3177B7A2BCBCA115682 BA325; and
the response data is:
0xF109EEFAC9FF691585D7F31195EA749B02E4DB-
7A3177B7A2BCBCA115682 BA325B2EF1D-
0F0E11098E9000.

Optionally, in this embodiment, step 204 further includes: if the data managing instruction is a PIN code updating instruction, executing step 241.

Further, if the managing instruction label data is fourth preset label data, the data managing instruction is a PIN code updating instruction, executing step 241.

Step 241, the electronic device determines whether the stored count data is legitimate, if yes, executes step 243; otherwise, executes step 242.

Optionally, this step is specifically that the electronic device determines whether the stored count data is equal to fourth preset data, if yes, the count data is not legitimate, executes step 242, otherwise, executes step 243.

Correspondingly, in step 242 and step 244, the electronic device resetting count data is specifically that the electronic device sets count data as default count data.

Correspondingly, in step 243, the electronic device updating count data is specifically that the electronic device adds eighth preset data to the count data.

Optionally, this step is specifically that the electronic device determines whether the count data is less than fifth preset data, if yes, the count data is legitimate, executes step 243; otherwise, executes step 242.

Correspondingly, in step 242 and step 244, the electronic device resetting count data is specifically that the electronic device sets count data as default count data.

Correspondingly, in step 243, the electronic device updating count data is specifically that the electronic device adds an eighth preset data to the count data.

Optionally, this step is specifically that the electronic device determines whether the count data is more than or equal to fifth preset data, if yes, the count data is not legitimate, executes step 242; otherwise, executes step 243.

Correspondingly, in step 242 and step 244, the electronic device resetting count data is specifically that the electronic device sets count data as default count data.

Correspondingly, in step 243, the electronic device updating count data is specifically that the electronic device adds eighth preset data to the count data.

Step 242, the electronic device resets the count data; deletes a seed data packet; resets a second PIN code data; sets the current purse state to be an unavailable state; and executes step D21.

Optionally, in this step, the resetting the second PIN code data is specifically that the electronic device sets the second PIN code data to be default PIN code data.

Step 243, the electronic device updates the count data; obtains a first PIN code data from the managing plain data; obtains second PIN code data stored therein; determines whether the second PIN code data is equal to the first PIN code data, if yes, executes step 244; otherwise, executes step D21.

Step 244, the electronic device resets the count data; obtains third PIN code data from the managing plain data; determines whether the third PIN code data is legitimate according to the preset PIN code data format, if yes, executes step 245; otherwise, executes step D21.

Step 245, the electronic device takes the third PIN code data as new second PIN code data, organizes second plain data according to a preset padding data block, and executes step D11.

Optionally, in this step, taking the third PIN code data as the new second PIN code data is specifically that the electronic device performs a hash operation on the third PIN code data, stores the obtained result of the hash operation as the second PIN code data.

Optionally, in this embodiment, step 204 further includes that if the data managing instruction is a resetting instruction, executing step 251.

Further, if the managing instruction label data is fifth preset label data, the data managing instruction is a resetting instruction, executing step 251.

Step 251, the electronic device resets the count data, deletes the seed data packet; resets the second PIN code data; sets the current purse state to be an unavailable state; organizes second plain data according to the preset padding data block; and executes step D11.

Optionally, resetting the count data is specifically that the electronic device sets the count data to be default count data.

Optionally, the resetting the second PIN code data is specifically that the electronic device sets the second PIN code data to be default PIN code data and stores the default PIN code data.

Optionally, in this embodiment, step 204 further includes that if the data managing instruction is an application updating instruction, executing step 261.

If the managing instruction label data is the sixth preset label data, the data managing instruction is an application updating instruction, executing step 261.

Step 261, the electronic device determines whether the stored count data is legitimate, if yes, executes step 263; otherwise, executes step 262.

Optionally, this step is specifically that the electronic device determines whether the stored count data is equal to the fourth preset data, if yes, the count data is not legitimate, executes step 262; otherwise, executes step 263.

Correspondingly, in step 262 and step 264, the electronic device resetting the count data is specifically that the electronic device sets the count data to be default count data.

Correspondingly, in step 263, the electronic device updating the count data is specifically that the electronic device deducts eighth preset data from the count data.

In this case, the count data of factory setting of the electronic device is default count data.

Optionally, this step is specifically that the electronic device determines whether the count data is less than fifth preset data, if yes, the count data is legitimate, executes step 263; otherwise, executes step 262.

Correspondingly, in step 262 and step 264, the electronic device resetting the count data is specifically that the electronic device sets the count data to be default count data.

Correspondingly, in step 263, the electronic device updating the count data is specifically that the electronic device adds eighth preset data to the count data.

In this case, the count data of factory setting of the electronic device is default count data.

Optionally, this step is specifically that the electronic device determines whether the count data is more than or equal to fifth preset data, if yes, the count data is not legitimate, executes step 262; otherwise, executes step 263.

Correspondingly, in step 262 and step 264, the electronic device resetting the count data is specifically that the electronic device sets the count data to be default count data.

Correspondingly, in step 263, the electronic device updating the count data is specifically that the electronic device adds eighth preset data to the count data.

In this case, the count data of factory setting of the electronic device is default count data.

Step 262, the electronic device resets the count data, deletes the seed data packet; resets the second PIN code data; sets the current purse state to be an unavailable state; and executes step D21.

Optionally, in this step, the resetting the second PIN code data is specifically that the electronic device sets the second PIN code data to be default PIN code data.

Step 263, the electronic device updates count data; obtains first PIN code data from managing plain data; obtains second PIN code data stored therein; determines whether the second PIN code data is equal to the first PIN code data, if yes, executes step 264; otherwise, executes step D21.

Step 264, the electronic device resets the count data; updates application data stored therein by using the application data in the managing plain data; and organizes second plain data according to the preset padding data block, and executes step D11.

Optionally, in this embodiment, step 204 further includes: if the data managing instruction is a certificate updating instruction, executing step 271; and if the managing instruction label data is seventh preset label data, the data managing instruction is a certificate updating instruction, executing step 271.

Step 271, the electronic device determines whether the stored count data is legitimate, if yes, executes step 273; otherwise, executes step 272.

Optionally, this step is specifically that the electronic device determines whether the stored count data is equal to the fourth preset data, if yes, the count data is not legitimate, executes step 272; otherwise, executes step 273.

Correspondingly, in step 272 and step 274, the electronic device resetting the count data is specifically that the electronic device sets the count data to be default count data.

Correspondingly, in step 223, the electronic device updating the count data is specifically that the electronic device deducts eighth preset data from the count data.

In this case, the count data of factory setting of the electronic device is default count data.

Optionally, this step is specifically that the electronic device determines whether the stored count data is less than fifth preset data, if yes, the count data is legitimate, executes step 273; otherwise, executes step 272.

Correspondingly, in step 272 and step 274, the electronic device resetting the count data is specifically that the electronic device sets the count data to be default count data.

Correspondingly, in step 273, the electronic device updating the count data is specifically that the electronic device adds eighth preset data to the count data.

In this case, the count data of factory setting of the electronic device is default count data.

Optionally, this step is specifically that the electronic device determines whether the stored count data is more than or equal to fifth preset data, if yes, the count data is not legitimate, executes step 272; otherwise, executes step 273.

Correspondingly, in step 272 and step 274, the electronic device resetting the count data is specifically that the electronic device sets the count data to be default count data.

Correspondingly, in step 273, the electronic device updating the count data is specifically that the electronic device adds eighth preset data to the count data.

In this case, the count data of factory setting of the electronic device is default count data.

Step 272, the electronic device resets the count data; deletes the seed data packet; resets the second PIN code data; sets the current purse state to be an unavailable state; and executes step D21.

Optionally, in this step, resetting the second PIN code data is specifically that the electronic device sets the second PIN code data to be default PIN code data.

Step 273, the electronic device updates the count data; obtains the first PIN code data from the managing plain data, obtains second PIN code data stored therein; determines whether the second PIN code data is equal to the first PIN code data, if yes, executes step 274; otherwise, executes step D21.

Step 274, the electronic device resets the count data; uses an electronic device certificate in the managing plain data to update an electronic device certificate stored therein, organizes the second plain data according to the preset padding data block; and organizes the second plain data according to the second preset state code, and executes step D11.

Optionally, in this embodiment, the electronic device can be a hardware purse for protecting the security of a digital currency account.

Embodiment 3

Figures 1, 2:
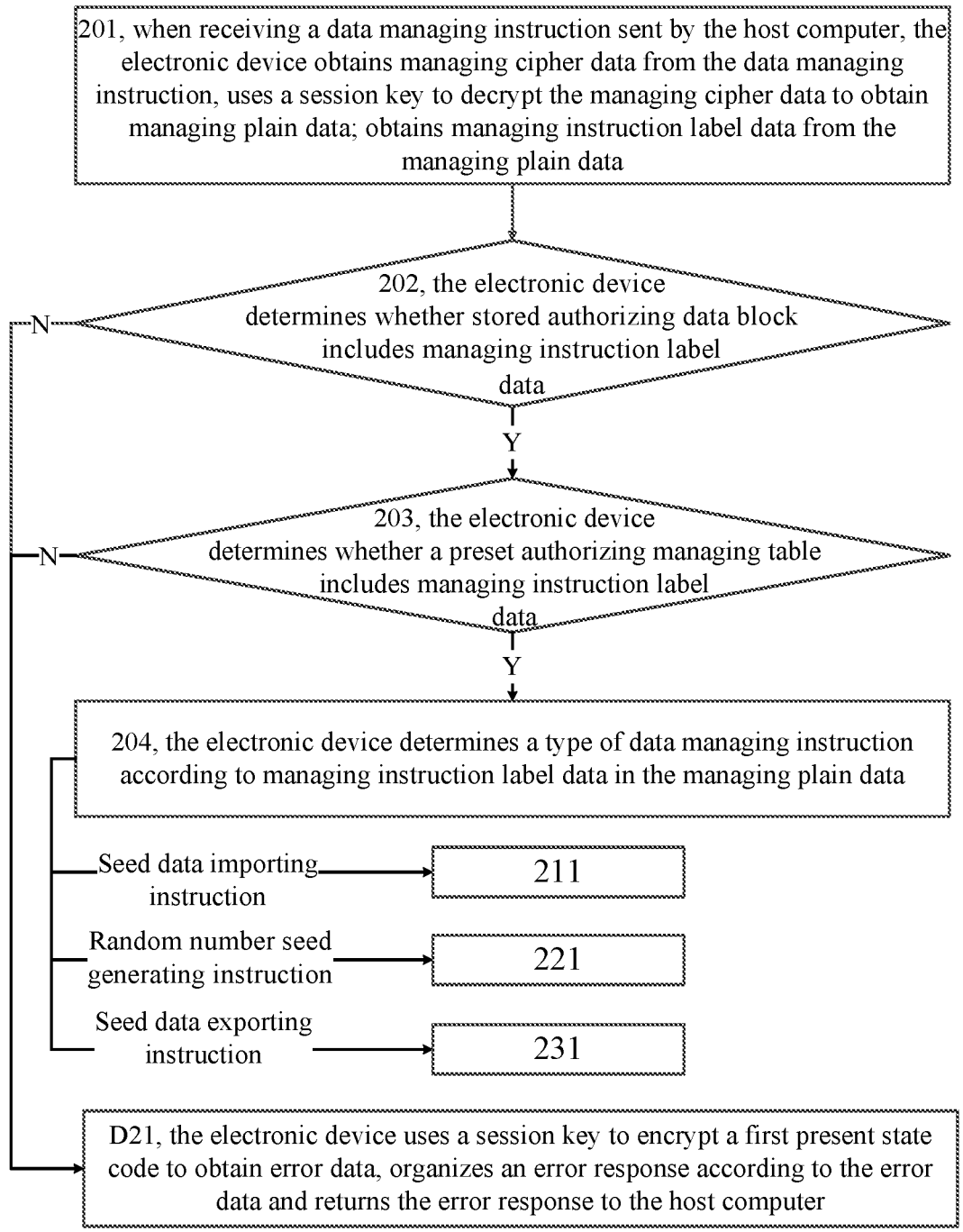
Figure 2:
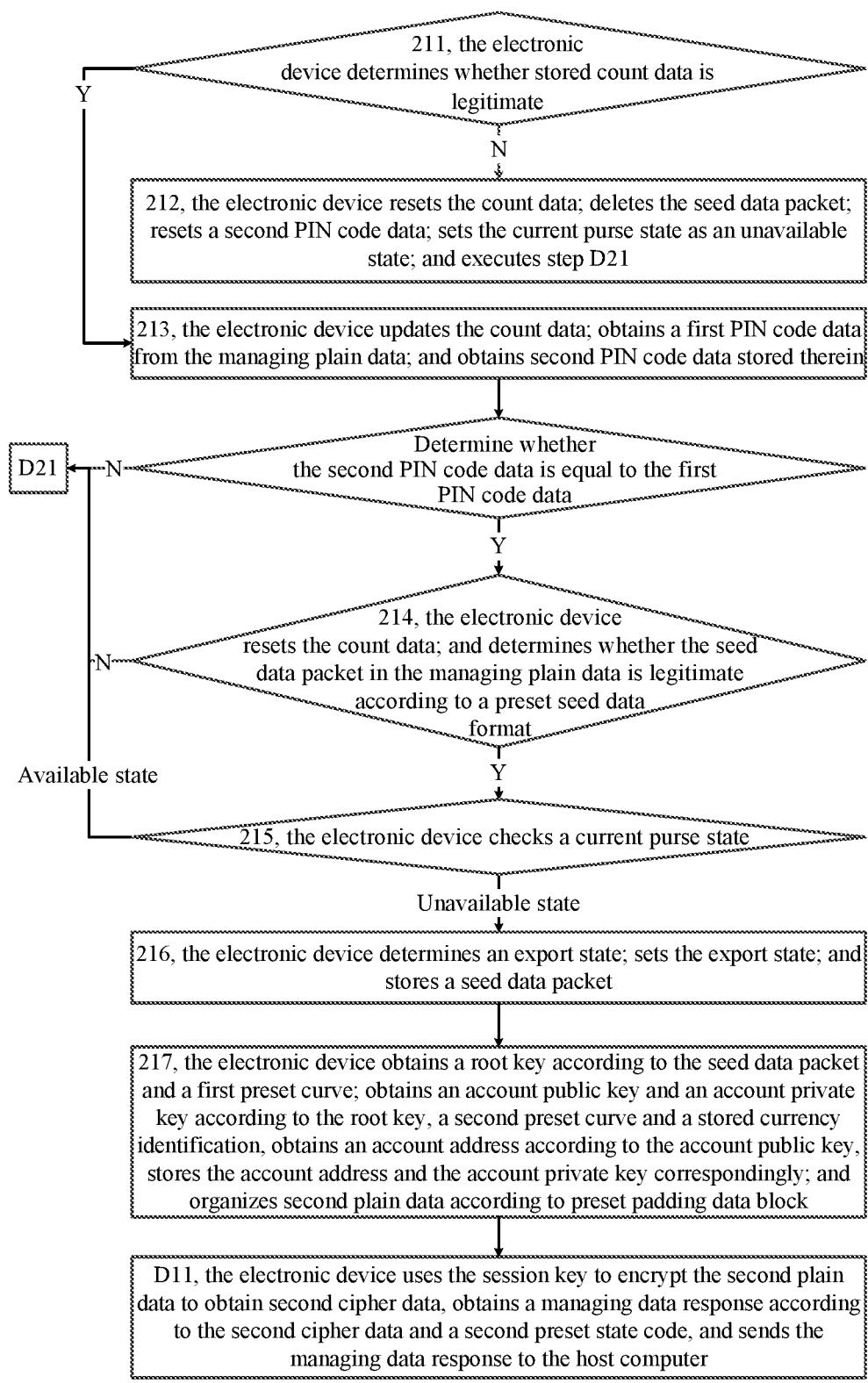
Figures 2, 3:
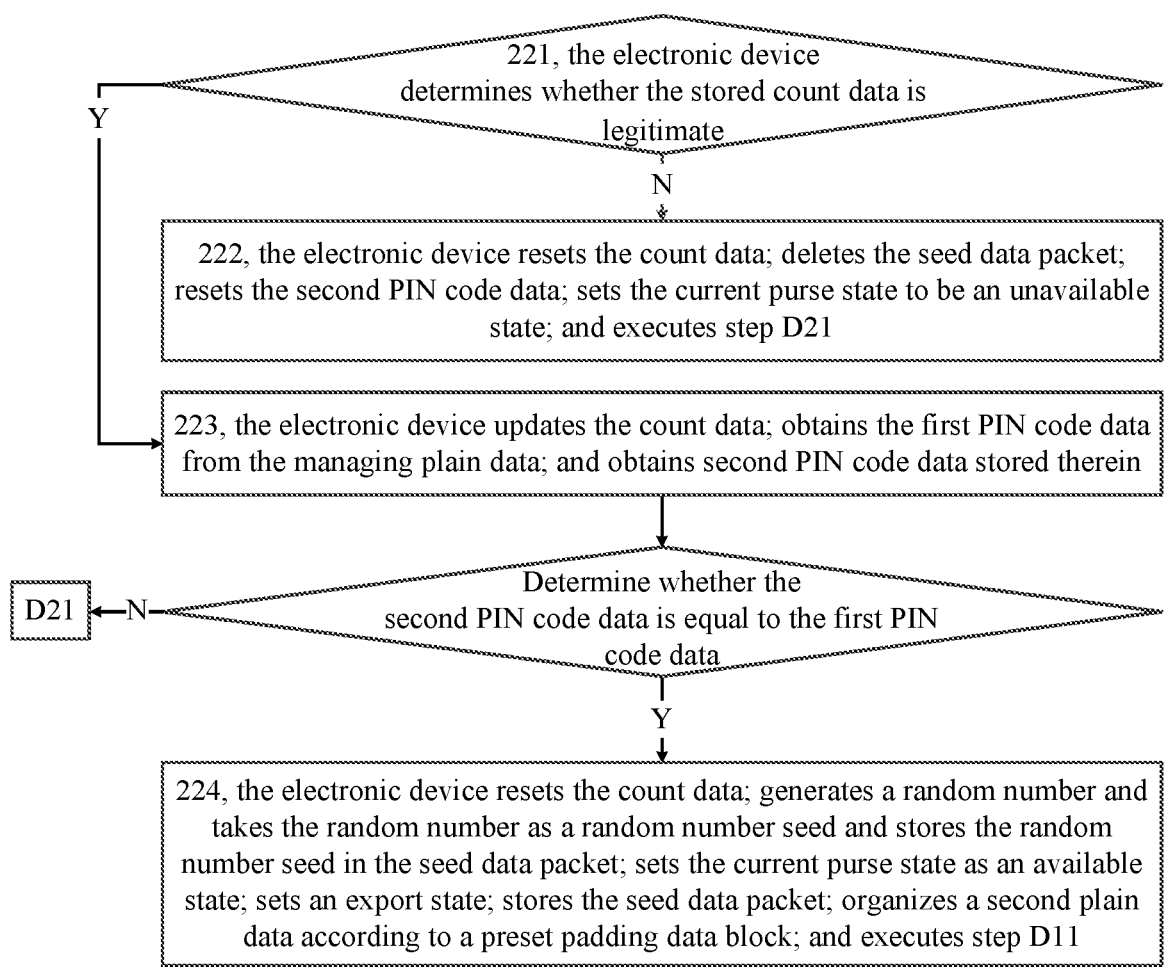
Figures 2, 3, 4:
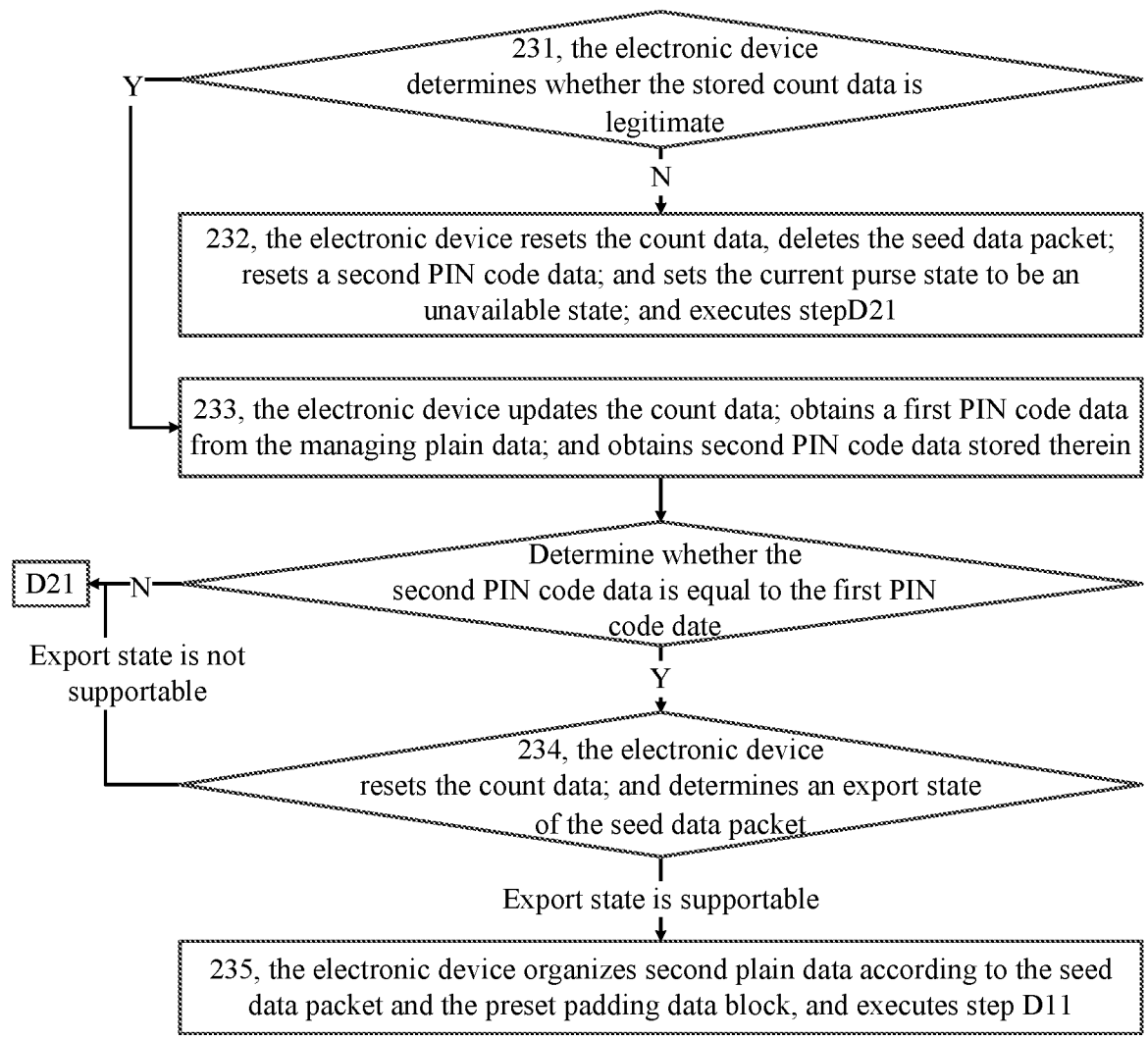
Figure 3:
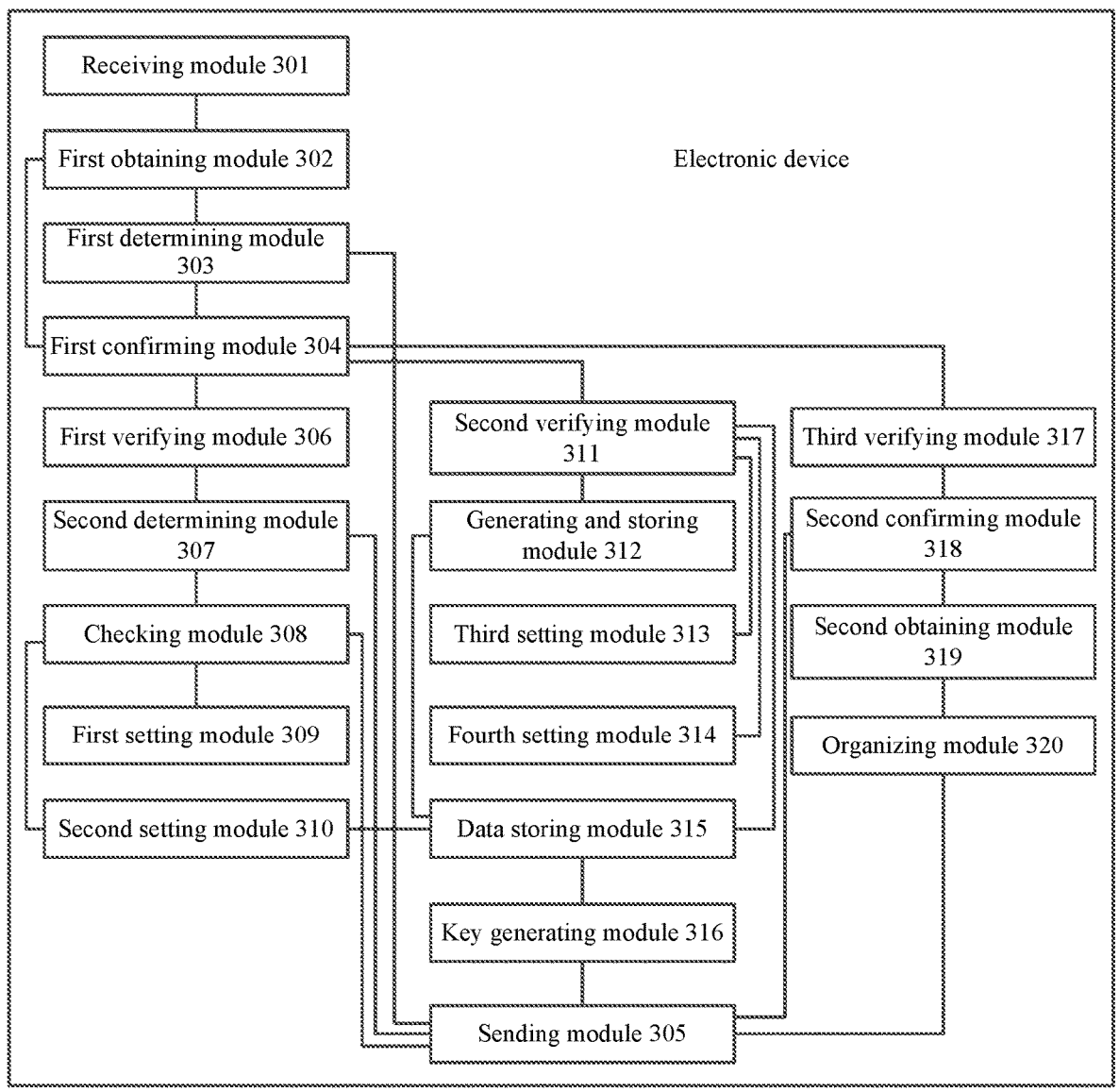

This embodiment provides an electronic device. As shown in FIG. 3, the electronic device includes: a receiving module 301, a first obtaining module 302, a first determining module 303, a first confirming module 304, a sending module 305, a first verifying module 306, a second determining module 307, a checking module 308, a first setting module 309, a second setting module 310, a second verifying module 311, a generating and storing module 312, a third setting module 313, a fourth setting module 314, a data storing module 315, a key generating module 316, a third verifying module 317, a second confirming module 318, a second obtaining module 319 and an organizing module 320.

the receiving module 301 is configured to receive a data managing instruction sent by a host computer;

the first obtaining module 302 is configured to obtain managing instruction label data from the data managing instruction received by the receiving module 301;

the first determining module 303 is configured to determine whether a stored authorizing data block includes the managing instruction label data obtained by the first obtaining module 302;

the first confirming module 304 is configured to determine a type of the data managing instruction according to the managing instruction label data obtained by the first obtaining module 302 if a determining result of the first determining module 303 is yes;

the sending module 305 is configured to send an error response to the host computer if a determining result of the first determining module 303 is no;

the first verifying module 306 is configured to perform a PIN code data verifying operation according to the data managing instruction if the first confirming module 304 confirms that the data managing instruction is a seed data importing instruction;

the second determining module 307 is configured to determine whether a seed data packet in the data managing instruction is legitimate according to a preset seed data format if the first verifying module 306 verifies PIN code data successfully;

the sending module 305 is further configured to send an error response to the host computer if a determining result of the second determining module 307 is no;

the checking module 308 is configured to check a current purse state if a determining result of the second determining module 307 is yes;

the sending module 305 is further configured to send an error response to the host computer if the checking module 308 checks that the current purse state is an available state;

the first setting module 309 is configured to set the current purse state to be an unavailable state if the checking module 308 checks that the current purse state is an unavailable state;

the second setting module 310 is configured to set an export state if the checking module 308 checks that the current purse state is an unavailable state;

the second verifying module 311 is configured to perform a PIN code data verifying operation according to the data managing instruction if the first confirming module 304 confirms that the data managing instruction is a random number seed generating instruction;

the generating and storing module 312 is configured to generate a random number and take the random number as a random number seed, and store the random number seed in the seed data packet, if the second verifying module 311 verifies PIN code data successfully;

the third setting module 313 is configured to set the current purse state to be an available state if the second verifying module 311 verifies PIN code data successfully;

the fourth setting module 314 is configured to set an export state if the second verifying module 311 verifies PIN code data successfully;

the data storing module 315 is configured to store a seed data packet if the second verifying module 311 verifies PIN code data successfully;

the key generating module 316 is configured to obtain a root key according to the seed data packet stored by the data storing module 315 and a first preset curve, obtain an account public key and an account private key according to the root key, a second preset curve and a stored currency identification, obtain an account address according to the account public key, and store the account address and the account private key correspondingly;

the third verifying module 317 is configured to perform a PIN code data verifying operation according to the data managing instruction if the first confirming module 304 confirms that the data managing instruction is a seed data exporting instruction;

the second confirming module 318 is configured to confirm an export state of the seed data packet if the third verifying module verifies PIN code data successfully;

the second obtaining module 319 is configured to obtain the seed data packet if the second confirming module 318 confirms that the export state is that the export state is supportable;

the organizing module 320 is configured to organize a data managing response according to the seed data packet obtained by the second obtaining module 319;

the sending module 305 is further configured to send the data managing response organized by the organizing module 320 sent to the host computer; and the sending module 305 is further configured to send an error response to the host computer if the second confirming module 318 confirms that the export state is that the export state is not supportable.

Optionally, the electronic device in this embodiment further includes: a fourth verifying module and a third obtaining module;
- correspondingly, the receiving module 301 is further configured to receive an authorizing instruction sent by the host computer;
- correspondingly, the fourth verifying module is configured to verify legitimacy of a host computer certificate in the authorizing instruction received by the receiving module 301;
- correspondingly, the third obtaining module is configured to obtain an authorizing data block from the host computer certificate in the authorizing instruction received by the receiving module 301 if the fourth verifying module verifies that the host computer certificate is legitimate and store the authorizing data block; and
- correspondingly, the sending module 305 is further configured to send an error response to the host computer if the fourth verifying module verifies that the host computer certificate is not legitimate.

Further, the electronic device of this embodiment further includes a third determining module and a fourth obtaining module; and the receiving module 301 includes a first receiving unit;
- correspondingly, the third determining module is configured to determine whether a stored authorizing data block is equal to third preset data if the fourth verifying module verifies that the host computer certificate is legitimate;
- correspondingly, the fourth obtaining module is configured to wait for receiving the data managing instruction if a determining result of the third determining module is yes; and
- obtain managing instruction label data from the managing data instruction when receiving the data managing instruction sent by the host computer; otherwise, trigger the first receiving unit;
- correspondingly, the first confirming module 304 is further configured to confirm a type of the data managing instruction according to the managing instruction label data obtained by the fourth obtaining module if the fourth obtaining module obtains the managing instruction label data from the data managing instruction; and
- correspondingly, the first receiving unit is configured to receive an authorizing instruction sent by the host computer.

Optionally, the electronic device of this embodiment further includes a fourth determining module;
- correspondingly, the fourth determining module is configured to determine whether a stored authorizing data block is equal to third preset data;
- correspondingly, the first determining module 303 is specifically configured to determine whether the stored authorizing data block includes the data managing label data obtained by the first obtaining module 302 if a determining result of the fourth determining module is yes; and
- correspondingly, the first confirming module 304 is further configured to determine a type of the managing data instruction according to the managing instruction label data obtained by the first obtaining module 302 if a determining result of the fourth determining module is no.

Optionally, the electronic device of this embodiment further includes a fifth determining module;
- correspondingly, the fifth determining module is configured to determine whether a preset authorizing managing table includes the managing instruction label data if a determining result of the first determining module 303 is yes;
- correspondingly, the first confirming module 304 is further configured to confirm a type of the data managing instruction according to the managing instruction label data obtained by the first obtaining module 302 if a determining result of the fifth determining module is yes; and
- correspondingly, the sending module 305 is further configured to send an error response to the host computer if a determining result of the fifth determining module is no.

Optionally, the second setting module 310 is specifically configured to, if the checking module 308 checks that a current purse state is an unavailable state, determine whether the seed data packet in the managing data instruction includes entropy data, if yes, the export state is that the export state is supportable; if no, the export state is that the export state is not supportable; and
- correspondingly, the second confirming module 318 is specifically configured to, if the third verifying module 317 verifies PIN code data successfully, determine whether seed data packet stored therein includes entropy data, if yes, the export state is that the export state is supportable; if no, the export state is that the export state is not supportable.

Further, the second setting module 310 further is configure to set an export state identification to be sixth preset data if the export state is that the export state is supportable; and set the export state identification to be seventh preset data if the export state is that the export state is not supportable;
- correspondingly, the fourth setting module 314 is specifically configured to set the export state identification to be seventh preset data; and
- correspondingly, the second confirming module 318 is specifically configured to, if the third verifying module 317 verifies PIN code data successfully, determine a type of an export state identification, if the type is sixth preset data, the export state is that the export state is supportable; and if the type is seventh preset data, the export state is that the export state is not supportable.

Optionally, the second setting module 310 is specifically configured to, if the checking module 308 checks that current purse state is an unavailable state, obtain export state data from the seed data packet, confirm a type of the export state according to the export state data, if the export state data is first preset export data, the export state is that the export state is supportable; and if the export state data is second preset export data, the export state is that the export state is not supportable.

Further, the second setting module 310 is further configured to set an export state identification to be a sixth preset data if the export state is that the export state is supportable; set the export state identification to be seventh preset data if the export state is not supportable.

Correspondingly, the fourth setting module 314 is specifically configured to set the export state identification to be seventh preset data; and
- correspondingly, the second confirming module 318 is specifically configured to, if the third verifying module 317 verifies PIN code data successfully, determine a type of an export state identification, if the type is sixth preset data, the export state is that the export state is supportable; and if the type is seventh preset data, the export state is that the export state is not supportable.

Optionally, the key generating module 316 is specifically configured to obtain a root key by performing an operation on the seed data in the seed data packet stored in the data storing module 315 and a first preset curve according to a first preset algorithm; and obtain an account public key and an account private key by performing an operation on the root key, a second preset curve and a stored currency identification according to a second preset algorithm.

Optionally, the first verifying module 306 is specifically configured to, if the first confirming module 304 confirms that the data managing instruction is a seed data importing instruction, obtain first PIN code data from the data managing instruction; obtain second PIN code data stored therein; determines whether the second PIN code data is equal to the first PIN code data, if yes, verifying PIN code data is successful; otherwise, verifying PIN code data is failed.

Further, the first verifying module 306 includes a first obtaining unit; and the first verifying module 306 further includes a first determining unit, a first resetting unit and a second resetting unit;

correspondingly, the first obtaining unit is configured to obtain first PIN code data from the data managing instruction;

correspondingly, the first determining unit is configured to determine whether stored count data is legitimate, if yes, update the count data and trigger the first obtaining unit; otherwise, trigger the first resetting unit and return an error response to the host computer;

correspondingly, the first resetting unit is configured to perform a resetting operation if a determining result of the first determining unit is no; and further, the first resetting unit is specifically configured to, if a determining result of the first determining unit is no, reset the count data; delete the seed data packet; reset the second PIN code data, set a current purse state to be an unavailable state, and return an error response to the host computer.

Correspondingly, the sending module 305 is further configured to return an error response to the host computer if a determining result of the first determining unit is no; and correspondingly, the second resetting unit is configured to reset the count data if the first verifying module 306 verifies PIN code data successfully.

Correspondingly, the second verifying module 311 is specifically configured to, if the first confirming module 304 determines that the data managing instruction is a random number seed generating instruction, obtain first PIN code data from the data managing instruction; obtains second PIN code data stored therein; determine whether the second PIN code data is equal to the first PIN code date, if yes, verifying PIN code data is successful; otherwise, verifying PIN code data is failed;

correspondingly, the second verifying module 311 includes a second obtaining unit; and the second verifying module 311 further includes a second determining unit, a third resetting unit and a fourth resetting unit;

correspondingly, the second obtaining unit is configured to obtain first PIN code data from the data managing instruction;

correspondingly, the second determining unit is configured to determine whether the stored count data is legitimate, if yes, update the count data and trigger the second obtaining unit; otherwise, trigger a third resetting unit, and return an error response to the host computer; and correspondingly, the third resetting unit is configured to perform a resetting operation if a determining result of the second determining unit is no.

Further, the third resetting unit is specifically configured to, if a determining result of the second determining unit is no, reset the count data; delete the seed data packet; reset the second PIN code data, reset the current purse state to be an unavailable state, and return an error response to the host computer.

Correspondingly, the sending module 305 is further configured to return an error response to the host computer if a determining result of the second determining unit is no; and correspondingly, the fourth resetting unit is configured to, if the second verifying module 311 verifies the PIN code data successfully, reset the count data.

Correspondingly, the third verifying module 317 is configured to, if the first confirming module 304 confirms that the data managing instruction is a seed data exporting instruction, obtain first PIN code data from the data managing instruction; obtain second PIN code data stored therein; determine whether the second PIN code data is equal to the first PIN code data, if yes, verifying PIN code data is successful; otherwise, verifying PIN code data is failed;

correspondingly, the third verifying module 317 includes a third obtaining unit; and the third verifying module 317 further includes a third determining unit, a fifth resetting unit and a sixth resetting unit;

correspondingly, the third obtaining unit is configured to obtain first PIN code data from the data managing instruction;

correspondingly, the third determining unit is configured to determine whether the stored count data is legitimate, if yes, update the count data and trigger the third obtaining unit; otherwise, trigger the fifth resetting unit, and return an error response to the host computer; and correspondingly, the fifth resetting unit is configured to, if a determining result of the third determining unit is no, perform a resetting operation.

Further, the fifth resetting unit is specifically configure to, if a determining result of the third determining unit is no, reset the count data; delete the seed data packet; and reset the second PIN code data, set the current purse state to be an unavailable state, and return an error response to the host computer.

Correspondingly, the sending module 305 is further configured to, if the third determining unit is no, return an error response to the host computer; and correspondingly, the sixth resetting unit is configured to, if the third verifying module 317 verifies PIN code data successfully, reset the count data.

Optionally, the electronic device of this embodiment further includes a PIN code updating module, where the PIN code updating module is configured to, if the first confirming module 304 confirms that the data managing instruction is a PIN code updating instruction, perform a PIN code data verifying an operation according to the data managing instruction; if PIN code data verifying is successful, obtain third PIN code data from the data managing instruction; store the third PIN code data as new second PIN code data; and send a data managing response to the host computer.

Optionally, the electronic device of this embodiment further includes a resetting module, where the resetting module is configured to, if the first confirming module 304 confirms that the data managing instruction is a resetting instruction, reset count data; delete seed data packet; reset the second PIN code data, and set the current purse state to be an unavailable state; and send a data managing response to the host computer.

Optionally, the electronic device of this embodiment further includes an application updating module, where the application updating module is configured to, if the first confirming module confirms that the data managing instruction is an application updating instruction, perform a PIN code data verifying operation according to the data managing instruction; and if PIN code data verifying is successful, update stored application data by using application data in the data managing instruction, and send a data managing response to the host computer.

Optionally, the electronic device in this embodiment further includes an application updating module; where the application updating module is configured to, if the first confirming module 304 confirms that the data managing instruction is a certificate updating instruction, perform a PIN code data verifying operation according to the data managing instruction; and if PIN code data operation verifying is successful, use a device certificate in the data managing instruction to update a stored device certificate and send a data managing response to the host computer.

The descriptions above are only specific implementations of the present disclosure, however, the electronic device and the protection scope thereof of the present disclosure is not limited to this, and any changes or replacements that can be easily thought of within the technical scope disclosed by the present disclosure by those skilled in the art shall fall within the electronic device and the protection scope thereof of the present disclosure. Therefore, the electronic device and the protection scope thereof of the present disclosure shall be subject to the electronic device and the protection scope thereof of the claims.

The invention claimed is:

1. A method for protecting a seed data packet by an electronic device, the method comprising the following steps:
    step M01, verifying, by the electronic device, legitimacy of a host computer certificate in an authorizing instruction when receiving the authorizing instruction sent by a host computer; wherein, when the host computer certificate is legitimate, obtaining an authorizing data block from the host computer certificate in the authorizing instruction, storing the authorizing data block, and determining, by the electronic device, whether the stored authorizing data block is equal to third preset data; when the stored authorizing data block is equal to third preset data, waiting for receiving a data managing instruction sent by the host computer, obtaining managing instruction label data from the data managing instruction when receiving the data managing instruction sent by the host computer, and executing step S02; and when the stored authorizing data block is not equal to third preset data, executing step S01;
    step S01, obtaining, by the electronic device, managing instruction label data from the data managing instruction when receiving the data managing instruction sent by the host computer, and determining whether the stored authorizing data block comprises the managing instruction label data; and when the stored authorizing data block comprises the managing instruction label data, executing step S02;
    step S02, determining, by the electronic device, a type of the data managing instruction according to the managing instruction label data; when the type of the data managing instruction is a seed data importing instruction, executing step S03; when the type of the data managing instruction is a random number seed generating instruction, executing step S05; and when the type of the data managing instruction is a seed data exporting instruction, executing step S07;
    step S03, performing, by the electronic device, a PIN code data verifying operation according to the data managing instruction; when PIN code data verifying is successful, determining whether the seed data packet in the data managing instruction is legitimate according to preset seed data format; and when the seed data packet in the data managing instruction is legitimate according to preset seed data format, executing step S04;
    step S04, checking, by the electronic device, a current purse state; when the current purse state is not an available state, setting the current purse state to be an available state, setting an export state, and executing step S06;
    step S05, performing, by the electronic device, a PIN code data verifying operation according to the data managing instruction; when PIN code data verifying is successful, generating the random number and taking the random number as a random number seed and storing the random number seed in the seed data packet, setting the current purse state as an available state, setting an export state, and executing step S06;
    step S06, storing, by the electronic device, the seed data packet, obtaining a root key according to the seed data packet and a first preset curve, obtaining an account public key and an account private key according to a root key, a second preset curve and a stored currency identification, obtaining an account address according to the account public key, storing the account address and the account private key correspondingly, and sending a data managing response to the host computer; and
    step S07, performing, by the electronic device, a PIN code data verifying operation according to the data managing instruction; when PIN code data verifying is successful, determining an export state of the seed data packet, when the export state is supportable, obtaining the seed data packet, organizing a data managing response according to the seed data packet, sending the data managing response to the host computer; and when the export state is not supportable, sending an error response to the host computer.

2. The method according to claim 1, wherein step S01 further comprises:
    determining, by the electronic device, whether the stored authorizing data block is equal to third preset data; when the stored authorizing data block is equal to third preset data, executing step S02; and when the stored authorizing data block is not equal to third preset data, determining whether the stored authorizing data block comprises the managing instruction label data.

3. The method according to claim 1, wherein, in step S01, when a determination is yes, further comprising: determining, by the electronic device, whether a preset authorizing managing table comprises the managing instruction label data; and when the preset authorizing managing table comprises the managing instruction label data, executing step S02.

4. The method according to claim 1, wherein:
    in step S04, the setting the export state is: determining, by the electronic device, the export state according to the seed data packet in the data managing instruction; when the seed data packet comprises entropy data, the export state is that the export state is supportable; and when the seed data packet does not comprise entropy data, the export state is that the export state is not supportable; and in step S07, the determining the export state of the seed data packet is: determining, by the electronic device, whether a seed data packet stored therein comprises entropy data; when the seed data packet stored therein comprises entropy data, the export state is that the export state is supportable; and when the seed data packet stored therein does not comprise entropy data, the export state is that the export state is not supportable.

5. The method according to claim 1, wherein, in step S04, the setting export state is: obtaining, by the electronic device, export state data from the seed data packet, determining a type of the export state according to the export state data; when the export state data is first preset export data, the export state is that the export state is supportable; and when the export state data is second preset export data, the export state is that the export state is not supportable.

6. The method according to claim 1, wherein, in step S06, the obtaining the root key according to the seed data packet and the first preset curve, obtaining the account public key and the account private key according to the root key, the second preset curve and the stored currency identification is: obtaining, by the electronic device, a root key by performing calculation on the seed data in the seed data packet and a first preset curve according to a first preset algorithm; and obtaining the account public key and the account private key by performing calculation on the root key, a second preset curve and the stored currency identification according to a second preset algorithm.

7. The method according to claim 1, wherein, in step S02, the method further comprises: when the type of the data managing instruction is a PIN code updating instruction, performing, by the electronic device, a PIN code data verifying operation according to the data managing instruction; and when PIN code data verifying is successful, obtaining third PIN code data from the data managing instruction, taking the third PIN code data as new second PIN code data and storing the new second PIN code data, and sending a data managing response to the host computer.

8. The method according to claim 1, wherein, in step S02, the method further comprises: when the type of the data managing instruction is an application updating instruction, performing, by the electronic device, a PIN code data verifying operation according to the data managing instruction; and when PIN code data verifying is successful, updating stored application data by using application data in the data managing instruction and sending a data managing response to the host computer.

9. An electronic device, comprising: a memory and a processor;
wherein the memory stores computer execution instructions, and
the processor executes the computer execution instructions stored in the memory, so that the processor is configured to perform:
step M01, verifying legitimacy of a host computer certificate in an authorizing instruction when receiving the authorizing instruction sent by the host computer; when the host computer certificate is legitimate, obtaining an authorizing data block from the host computer certificate in the authorizing instruction and storing the authorizing data block, and determining whether the stored authorizing data block is equal to third preset data; when the stored authorizing data block is equal to third preset data, waiting for receiving a data managing instruction sent by the host computer, and obtaining managing instruction label data from the data managing instruction when receiving the data managing instruction sent by the host computer, and executing step S02; and when the stored authorizing data block is not equal to third preset data, executing step S01;

step S01, obtaining managing instruction label data from the data managing instruction when receiving the data managing instruction sent by the host computer; and determining whether a stored authorizing data block comprises the managing instruction label data; and when the stored authorizing data block comprises the managing instruction label data, executing step S02;

step S02, determining a type of the data managing instruction according to the managing instruction label data; when the type of the data managing instruction is a seed data importing instruction, executing step S03; when the type of the data managing instruction is a random number seed generating instruction, executing step S05; and when the type of the data managing instruction is a seed data exporting instruction, executing step S07;

step S03, performing a PIN code data verifying operation according to the data managing instruction, when PIN code data verifying is successful, determining whether the seed data packet in the data managing instruction is legitimate according to preset seed data format; and when the seed data packet in the data managing instruction is legitimate according to preset seed data format, executing step S04;

step S04, checking a current purse state; when the current purse state is not an available state, setting the current purse state to be an available state, setting an export state, and executing step S06;

step S05, performing a PIN code data verifying operation according to the data managing instruction, when PIN code data verifying is successful; generating the random number and taking the random number as a random number seed and storing the random number seed in the seed data packet; setting the current purse state as an available state, setting an export state, and executing step S06;

step S06, storing the seed data packet,-obtaining a root key according to the seed data packet and a first preset curve, obtaining an account public key and an account private key according to a root key, a second preset curve and a stored currency identification, obtaining an account address according to the account public key, storing the account address and the account private key correspondingly and sending a data managing response to the host computer; and step S07, performing a PIN code data verifying operation according to the data managing instruction, when PIN code data verifying is successful, determining an export state of the seed data packet, when the export state is supportable, obtaining the seed data packet, organizing a data managing response according to the seed data packet, sending the data managing response to the host computer; and when the export state is not supportable, sending an error response to the host computer.

10. The electronic device according to claim 9, wherein the processor is further configured to perform:
determining whether the stored authorizing data block is equal to third preset data; when the stored authorizing data block is equal to third preset data, executing step S02; and when the stored authorizing data block is not equal to third preset data, determining whether the stored authorizing data block comprises the managing instruction label data.

11. The electronic device according to claim 9, wherein, in step S01, when a determination is yes, the processor is further configured to perform: determining whether a preset authorizing managing table comprises the managing instruction label data; and when the preset authorizing managing table comprises the managing instruction label data, executing step S02.

12. The electronic device according to claim 9, wherein in step S04, the processor is specifically configured to perform:
determining the export state according to the seed data packet in the data managing instruction; when the seed data packet comprises entropy data, the export state is that the export state is supportable; and when the seed data packet does not comprise entropy data, the export state is that the export state is not supportable; and
in step S07, the processor is specifically configured to perform: determining whether a seed data packet stored therein comprises entropy data; when the seed data packet stored therein comprises entropy data, the export state is that the export state is supportable; and when the seed data packet stored therein does not comprise entropy data, the export state is that the export state is not supportable.

13. The electronic device according to claim 9, wherein, in step S04, the processor is specifically configured to perform:
obtaining export state data from the seed data packet, determining a type of the export state according to the export state data; when the export state data is first preset export data, the export state is that the export state is supportable; and when the export state data is second preset export data, the export state is that the export state is not supportable.

14. The electronic device according to claim 9, wherein, in step S06, the processor is specifically configured to perform:
obtaining a root key by performing calculation on the seed data in the seed data packet and a first preset curve according to a first preset algorithm; and obtaining the account public key and the account private key by performing calculation on the root key, a second preset curve and the stored currency identification according to a second preset algorithm.

15. The electronic device according to claim 9, wherein, in step S02, the processor is further configured to perform:
when the type of the data managing instruction is a PIN code updating instruction, performing a PIN code data verifying operation according to the data managing instruction; and when PIN code data verifying is successful, obtaining third PIN code data from the data managing instruction, taking the third PIN code data as new second PIN code data and storing the new second PIN code data, and sending a data managing response to the host computer.

16. The electronic device according to claim 9, wherein, in step S02, the processor is further configured to perform:
when the type of the data managing instruction is an application updating instruction, performing a PIN code data verifying operation according to the data managing instruction; and when PIN code data verifying is successful, updating stored application data by using application data in the data managing instruction and sending a data managing response to the host computer.

17. The method according to claim 1, wherein performing, by the electronic device, the PIN code data verifying operation according to the data managing instruction further comprises:
determining, by the electronic device, whether stored count data is legitimate; when the stored count data is legitimate, updating the count data, and performing the PIN code data verifying operation; and when the stored count data is not legitimate, resetting the count data, and reporting an error response to the host computer.

\* \* \* \* \*